(12) United States Patent
Moloni et al.

(10) Patent No.: US 8,424,364 B2
(45) Date of Patent: Apr. 23, 2013

(54) ACTIVE SCANNER BOW COMPENSATOR

(75) Inventors: Katerina Moloni, Middleton, WI (US);
Richard Arndt, Sauk City, WI (US);
Lucas Chasteen, Madison, WI (US);
Douglas M. Code, Madison, WI (US);
Adam Frost, Madison, WI (US);
Timothy K. Klemp, Marshall, WI (US)

(73) Assignee: nPoint, Inc., Middleton, WI (US)

( * ) Notice: Subject to any disclaimer, the term of this patent is extended or adjusted under 35 U.S.C. 154(b) by 590 days.

(21) Appl. No.: 12/618,316

(22) Filed: Nov. 13, 2009

(65) Prior Publication Data

US 2010/0117565 A1    May 13, 2010

Related U.S. Application Data

(60) Provisional application No. 61/114,212, filed on Nov. 13, 2008.

(51) Int. Cl.
*G01C 25/00* (2006.01)
*G01P 21/00* (2006.01)
*H02N 2/06* (2006.01)
*G01Q 40/00* (2010.01)
*G01Q 10/00* (2010.01)

(52) U.S. Cl.
USPC ................... 73/1.79; 850/1; 850/19

(58) Field of Classification Search ............ 73/1.75, 73/1.79; 310/12.05–12.06, 328; 318/466, 318/470, 638, 648–649, 662; 850/1, 8–919
See application file for complete search history.

(56) References Cited

U.S. PATENT DOCUMENTS

| | | | | |
|---|---|---|---|---|
| 2,013,656 A | * | 9/1935 | Karnes | 89/206 |
| 2,658,277 A | * | 11/1953 | Davis et al. | 89/202 |
| 3,331,575 A | * | 7/1967 | Anderson et al. | 248/180.1 |
| 4,066,341 A | * | 1/1978 | Schubert | 359/876 |
| 4,814,622 A | * | 3/1989 | Gregory et al. | 850/18 |
| 6,359,678 B1 | * | 3/2002 | Ota | 355/53 |
| 7,218,337 B2 | * | 5/2007 | Yokoyama | 347/241 |
| 7,224,460 B2 | * | 5/2007 | Soga et al. | 356/444 |
| 7,226,057 B2 | * | 6/2007 | Eichhorn et al. | 280/6.153 |
| 2002/0110077 A1 | * | 8/2002 | Drobot et al. | 369/112.27 |
| 2004/0204652 A1 | * | 10/2004 | Zavislan et al. | 600/476 |
| 2004/0223195 A1 | * | 11/2004 | Nomura | 358/509 |
| 2008/0001066 A1 | * | 1/2008 | Ax et al. | 250/208.1 |

FOREIGN PATENT DOCUMENTS

| | | | |
|---|---|---|---|
| DE | 19809589 A1 | * | 9/1999 |
| EP | 704738 A1 | * | 4/1996 |
| JP | 02285322 A | * | 11/1990 |
| JP | 06111004 A | * | 4/1994 |
| JP | 11177779 A | * | 7/1999 |
| JP | 11234547 A | * | 8/1999 |
| JP | 2008003373 A | * | 1/2008 |

* cited by examiner

*Primary Examiner* — Thomas P Noland
(74) *Attorney, Agent, or Firm* — Joseph T. Leone, Esq.; Daniel A. Blasiole; DeWitt Ross & Stevens, S.C.

(57) ABSTRACT

An active scanner bow compensator for use with a scanner is described. The scanner includes a moveable scanning platform supported within a frame. The active scanner bow compensator supports the scanner and includes a frame of reference, sensors, and an actuator. The sensors detect out-of-plane motion of the scanning platform relative to the frame of reference, and the actuators compensate for the out-of-plane motion by adjusting the orientation of the frame relative to the frame of reference. The active scanner bow compensator may be used in atomic force microscopy applications.

22 Claims, 11 Drawing Sheets

Scan: 180 μm

Scan: 180 μm

Scan: 180 µm

Scan: 180 µm

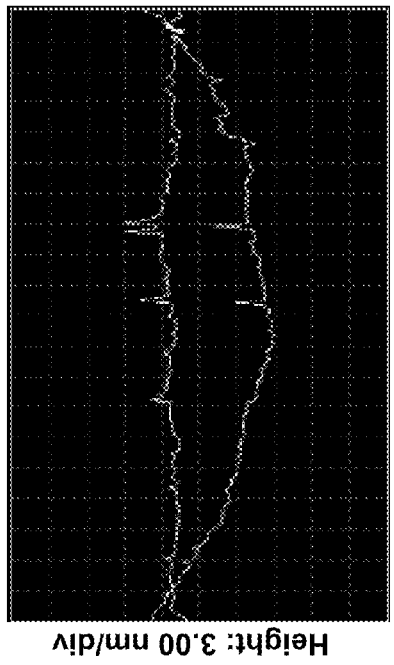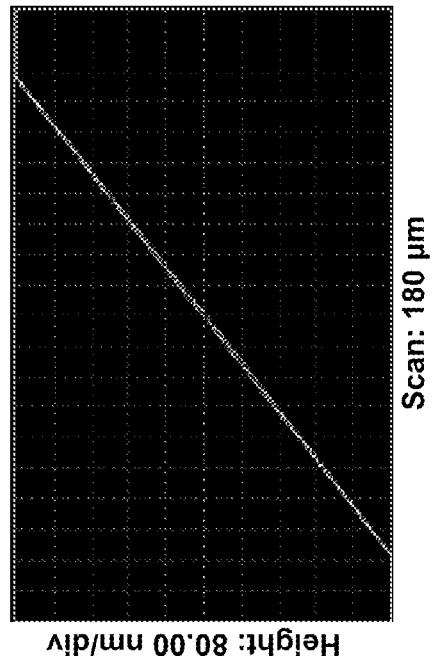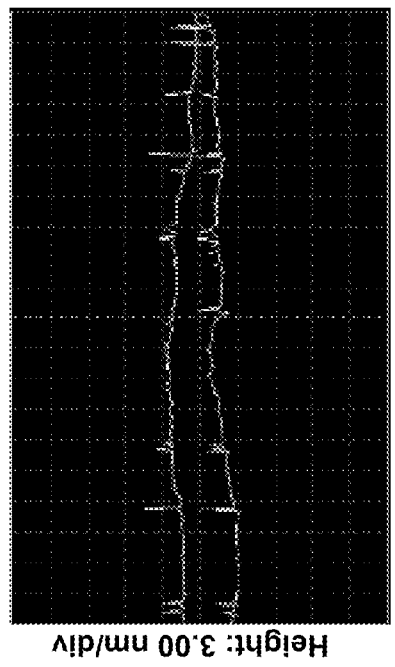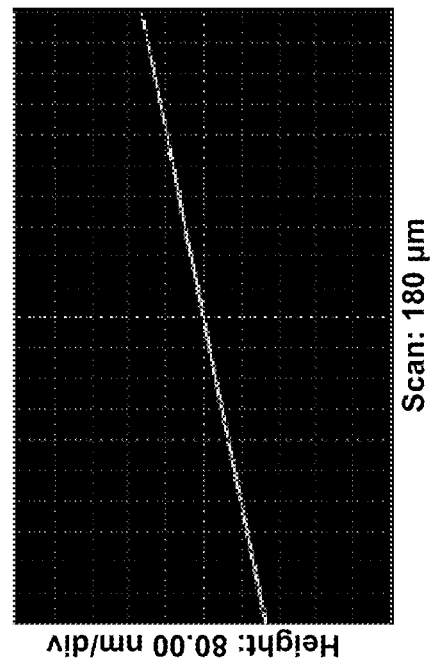

ACTIVE SCANNER BOW COMPENSATOR

CROSS REFERENCE TO RELATED APPLICATIONS

This application claims priority under 35 USC §119(e) to U.S. Provisional Patent Application 61/114,212 filed Nov. 13, 2008, the entirety of which is incorporated herein by reference.

FIELD OF THE INVENTION

The invention relates to devices used to correct error caused by bowing of flexure scanners in applications such as atomic force microscopy.

BACKGROUND OF THE INVENTION

In the data storage industry, companies utilize atomic force microscopes (AFMs) to characterize media (such as hard disks) or heads (such as recording heads). During AFM operation, an AFM probe is scanned over a surface to be characterized (see FIG. 1A), or, alternatively, the surface is scanned under the probe (see FIGS. 1B and 1C). Similar scanning techniques are used in other types of microscopy as well.

Early AFM designs used a piezotube scanner or tube scanner. These designs are problematic because the scanner is prone to bowing in the Z direction as it scans the sample in the X and Y directions, depicted graphically in FIG. 2. Error caused by bowing of a piezotube scanner varies non-systematically and can be as high as 60 nm over 100 μm of horizontal scanning range.

Current AFM manufacturers that serve the data storage industry provide metrology-grade scanners where piezotube scanners have been eliminated and replaced with flexure stages. Flexure stages can be XYZ scanners (see FIG. 1B), XY scanners to be used with separate Z scanners (see FIG. 1C), or linear scanners (X or Y axis) to be used with separate Z scanners. The typical error caused by bowing of a flexure stage is about 10 nm over 100 μm of horizontal scanning range.

nPoint, Madison, Wis., has previously succeeded in manufacturing 100-μm XY flexure scanners with out-of-plane scanner bow that can be less than 2 nm in certain limited circumstances. Minimal error on this order is now a requirement of many users of AFM technology, such as those in the data storage and semiconductor industries. Consequently, these scanners have been adopted by AFM manufacturers such as Veeco (Plainview, N.Y.) and are also sold as upgrades for existing AFMs, such as Veeco's Dimension Vx200/300 Atomic Force Profiler. In a typical configuration, the XY flexure scanner scans in the XY planes and a Veeco metrology head performs the scanning in the Z plane, as is shown in FIG. 1C.

In the above-mentioned system, the out-of-plane bow can be controlled to 2 nm if the sample is placed in the central area of the scanning platform. However, bowing can reach magnitudes between 5 and 10 nm when scanning in the periphery of the platform, such as the corners of the platform.

There is a need for flexure scanners that exhibit no greater than 2 nm bow per 100 μm of scanning range for scanning ranges up to about 1 mm.

SUMMARY OF THE INVENTION

The present invention includes devices for compensating for out-of-plane motion of a scanner.

A preferred version of the invention includes a scanner and a compensator. The scanner includes a frame and a scanning platform supported within the frame. The frame defines X and Y axes of a first plane, and the scanning platform is moveable within the frame along at least one axis of the first plane. The compensator includes a frame of reference, a sensor, and an actuator operationally connected to the sensor. The frame of reference defines X and Y axes of a second plane. The sensor detects out-of-plane motion of the scanning platform, and the actuator changes the orientation of the first plane relative to the second plane to compensate for the out-of-plane motion of the scanning platform detected by the sensor. The first and second planes may be defined by the physical surfaces of the frame and frame of reference, respectively. Alternatively, they may be theoretical constructs based on known surface dimensions of the frame and frame of reference, which are accounted for in the operational connection between the sensor and the actuators.

In some versions of the invention, the sensor is disposed between the frame of reference and the scanning platform. More specifically, the sensor may contact both a top surface of the frame of reference and an exposed, bottom portion of the scanning platform to detect out-of-plane motion of the scanning platform.

In some versions of the invention, the actuator is disposed between the frame of reference and the frame. More specifically, the actuator may contact a top surface of the frame of reference and a bottom surface of the frame to allow for adjustment of the orientation of the frame relative to the frame of reference upon compression or expansion of the actuator.

Some versions of the invention include an array of sensors and/or an array of actuators. In particular versions, each sensor in the array of sensors corresponds with a single actuator in the array of actuators to form pairs of sensors and actuators, wherein each sensor is collinear with the corresponding actuator along a line emanating from a center of the frame of reference, and the pairs of sensors and actuators are radially symmetrical about the center of the frame of reference. The line emanating from the center of the frame of reference preferably proceeds along the XY plane defined by the frame of reference. In specific versions, the array of sensors includes at least three sensors, and the array of actuators also includes at least three actuators.

Further versions of the invention include a controller operationally connecting the sensor and the actuator, wherein the controller receives positional information from the sensor and delivers an input signal to the actuators and wherein the input signal induces the actuator to change the orientation of the first plane relative to the second plane to compensate for the out-of-plane motion of the scanning platform.

Other versions of the invention include a mounting support connecting the frame of reference to the frame, wherein the mounting support is substantially moveable only in an axis orthogonal to the second plane such that the mounting support inhibits translational motion of the frame relative to the frame of reference along either the first or second planes.

The invention also includes methods of compensating for out-of-plane motion of a scanner that includes a scanning platform supported by a frame that defines X and Y axes of a first plane, wherein the scanning platform is moveable relative to the frame along the X or Y axis of the first plane. A first step includes supporting the scanner on a compensator, wherein the compensator includes a frame of reference defining X and Y axes of a second plane. A second step includes detecting out-of-plane motion of the scanning platform. Finally, a third step includes adjusting the orientation of the first plane relative to the second plane with an actuator operationally connected to the sensor, wherein the adjusting substantially compensates for the out-of-plane motion of the scanning platform detected by the sensor.

The methods described herein can reduce the out-of-plane motion of the scanning platform to no greater than 2 nm over a 100-µm scanning range.

The objects and advantages of the invention will appear more fully from the following detailed description of the preferred embodiment of the invention made in conjunction with the accompanying drawings.

BRIEF DESCRIPTION OF THE DRAWINGS

FIG. 11A shows a graph depicting out-of-plane scanner bow in nm on the Y-axis versus scanner travel on the X-axis with a 180-µm scan of a sample having a small topographical slope, performed at a corner of a scanning platform with active compensation. The trace was corrected for the average topographical slope shown in FIG. 11B.

FIG. 11B shows a graph depicting the average topographical slope of the sample scanned in FIG. 11A.

FIG. 12A shows a graph depicting out-of-plane scanner bow in nm on the Y-axis versus scanner travel on the X-axis with a 180-µm scan of a sample having a large topographical slope, performed at a corner of a scanning platform with active compensation. The trace was corrected for the average topographical slope shown in FIG. 12B.

FIG. 12B shows a graph depicting the average topographical slope of the sample scanned in FIG. 12A.

DETAILED DESCRIPTION OF THE INVENTION

The current invention provides for flexure scanning systems designed to minimize effects of scanner bow by compensating for out-of-plane motion of scanner platforms. As used herein, "scanner bow" and "out-of-plane motion" refer to the flexure of scanner components beyond an XY plane defined by the scanner. The reduction in scanner bow is accomplished by use of a scanner in combination with an active scanner-bow compensator.

Figure 1A:
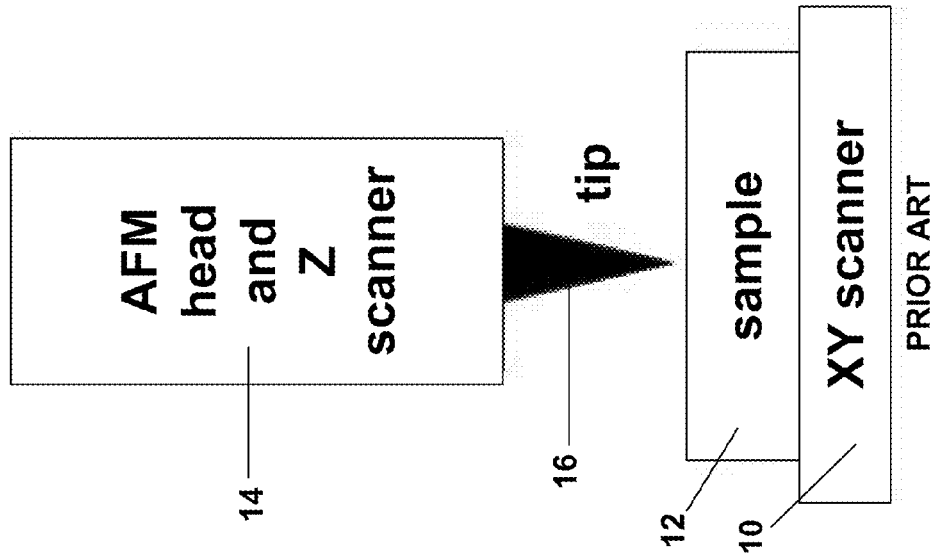
FIG. 1A shows a front elevation schematic of a tip-scanning system of the prior art comprising an XYZ piezotube scanner on an AFM head.
Figure 1B:
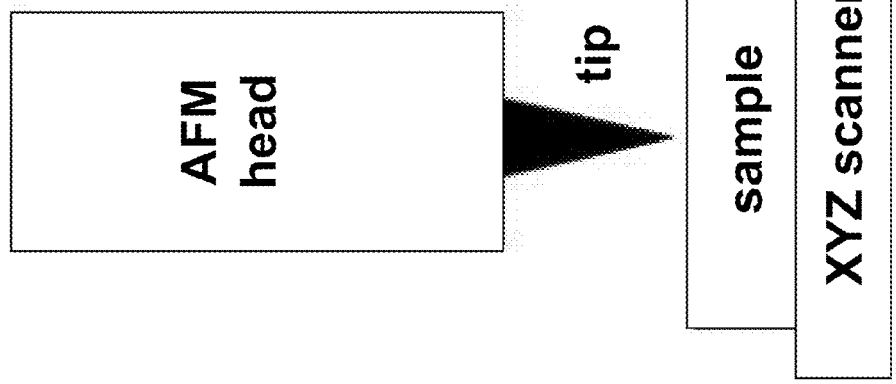
FIG. 1B shows a front elevation schematic of a sample-scanning system of the prior art comprising an XYZ-scanning flexure stage under a static AFM head.
Figure 1C:
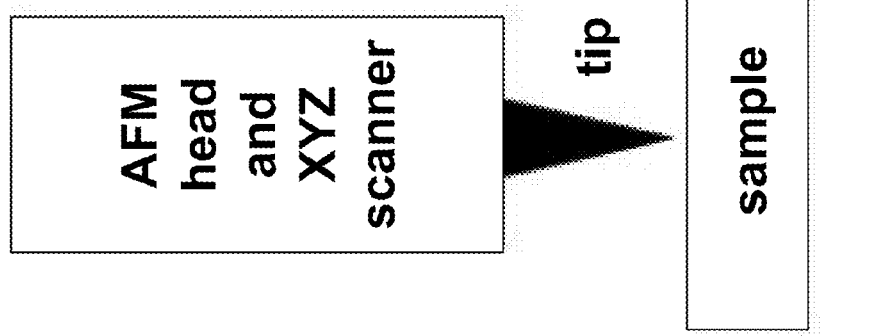
FIG. 1C shows a front elevation schematic of an XY sample-scanning system of the prior art comprising an XY-scanning flexure stage and an independent Z scanner on an AFM head.
Figure 2:
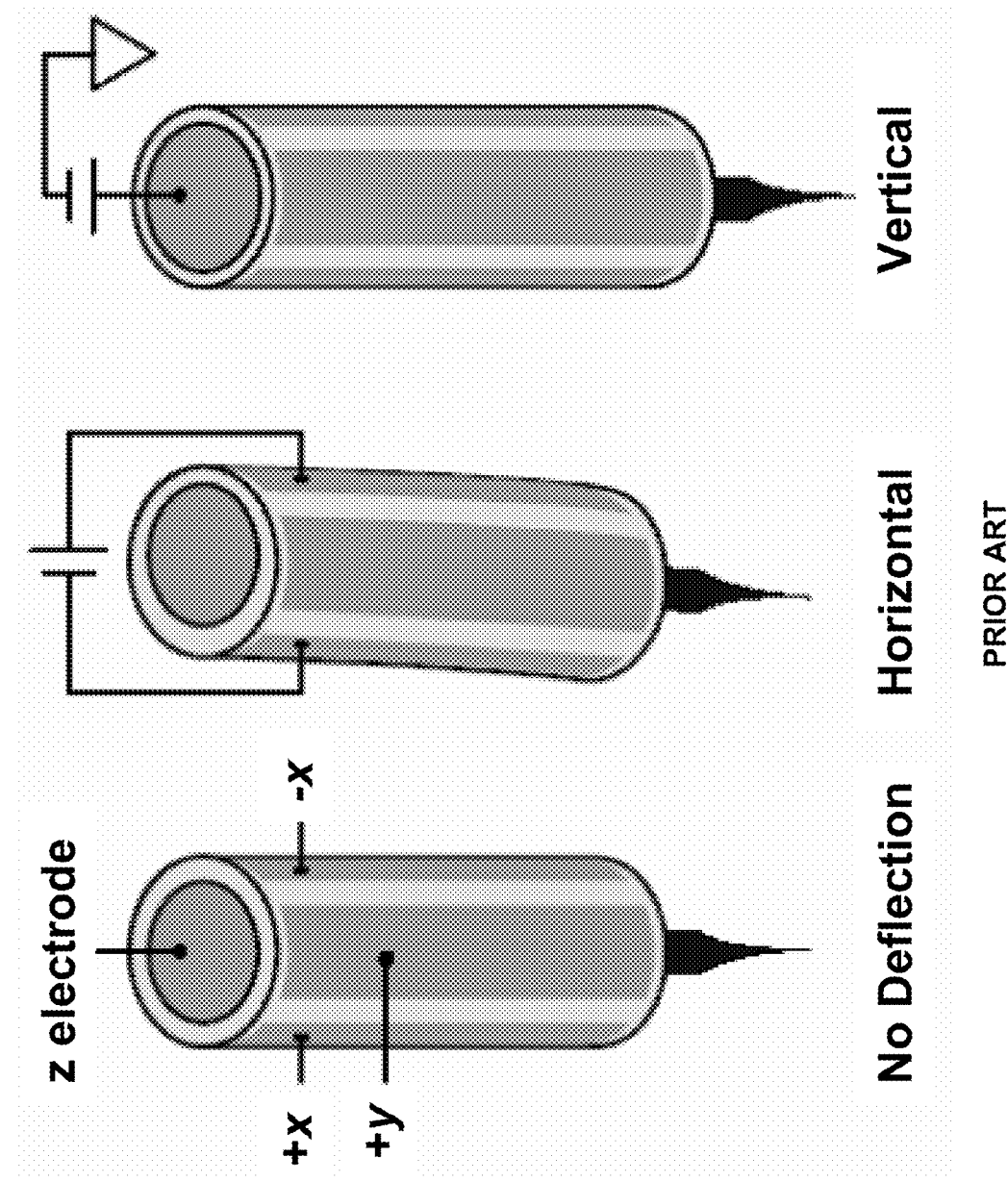
FIG. 2 shows a front elevation schematic depicting an example of bowing of a piezotube scanner of the prior art as it scans in a horizontal direction.

In a preferred version of the invention, the active scanner bow compensator is incorporated in an AFM configuration as depicted in FIG. 1C. This version employs an XY scanner 10 upon which a sample 12 is placed. An AFM head, which is positioned above the XY scanner 10, contains a Z scanner 14 with a probe tip 16. In use, the XY scanner 10 moves in both the X and Y axes of the XY plane while the probe tip 16 of the Z scanner 14 contacts the sample 12. The topographical variations of the sample 12 at each XY position are recorded by the Z scanner 14.

Figure 3:
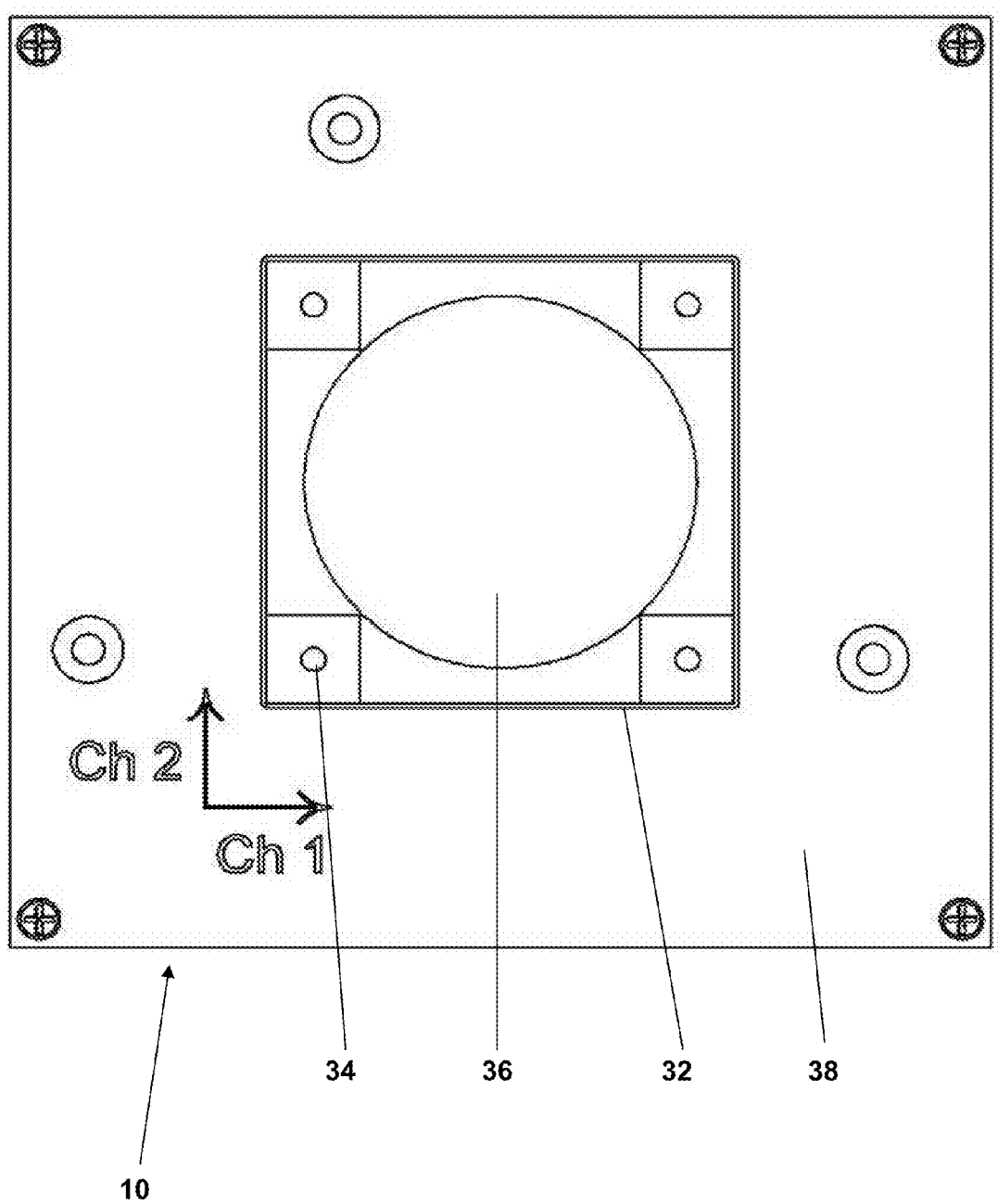
FIG. 3 shows a top plan schematic of an XY-scanner used in a version of the current invention.
Figure 4:
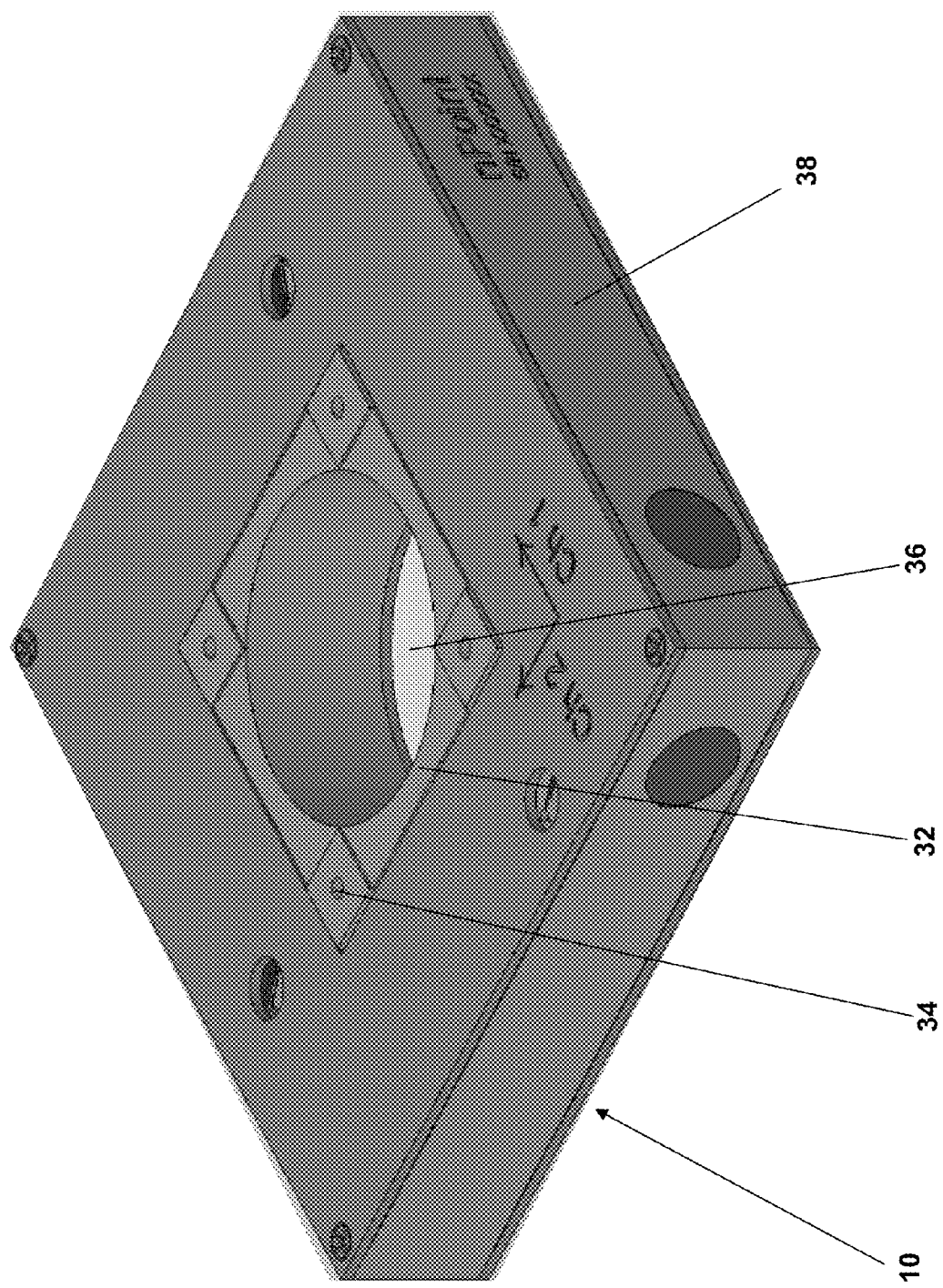
FIG. 4 shows a perspective rendering of an XY-scanner used in a version of the current invention.

An exemplary version of an XY scanner 10 that may be used in the current invention is shown in FIGS. 3 and 4. The XY scanner 10 is comprised of a frame 38 that supports a scanning platform 32. The scanning platform 32 is moveable relative to the frame 38 in the X and Y axes of the XY plane. Some versions may use scanning platforms 32 capable of scanning in only one axis of the XY plane (e.g., either X or Y axis). For data storage and semiconductor applications, the scanning platform 32 preferably comprises a 50 mm×50 mm area. Scanning platforms 32 having other dimensions may be used. The stage may further contain mounting holes 34 for mounting a sample 12 (see FIG. 1C). The sample 12 (see FIG. 1C) may be mounted in a fixture (not shown) that attaches to the scanning platform 32 of the XY scanner 10 via the mounting holes 34. The scanning platform 32 shown in FIGS. 3 and 4 contains four mounting holes 34 disposed in each of four corners of the platform. The frame 38 additionally defines a center aperture 36, allowing access to an underside of the scanning platform 32 from beneath the frame.

Figure 5:
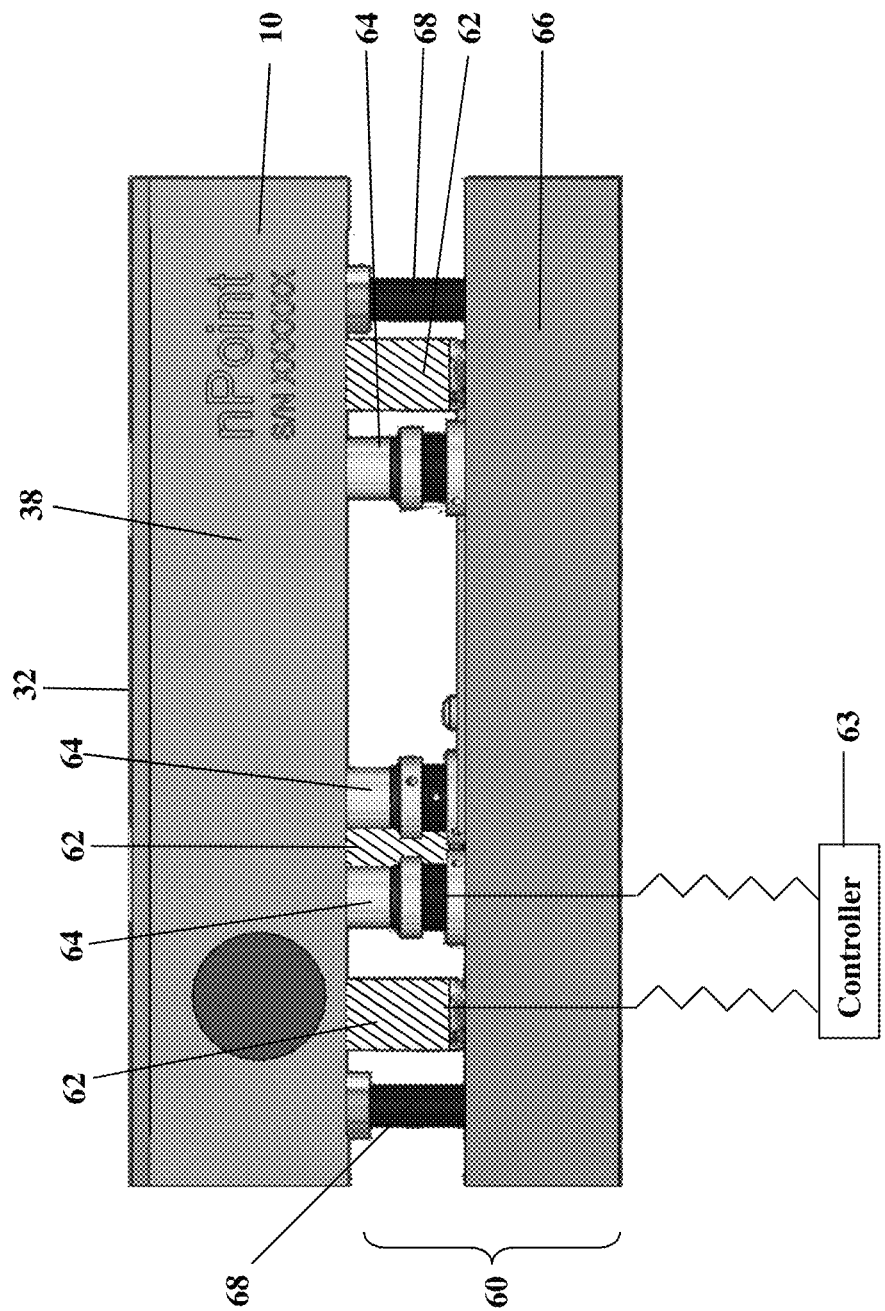
FIG. 5 shows a front elevation view of an XY-scanner and an active scanner bow compensator in accordance with a version of the current invention.
Figure 6:
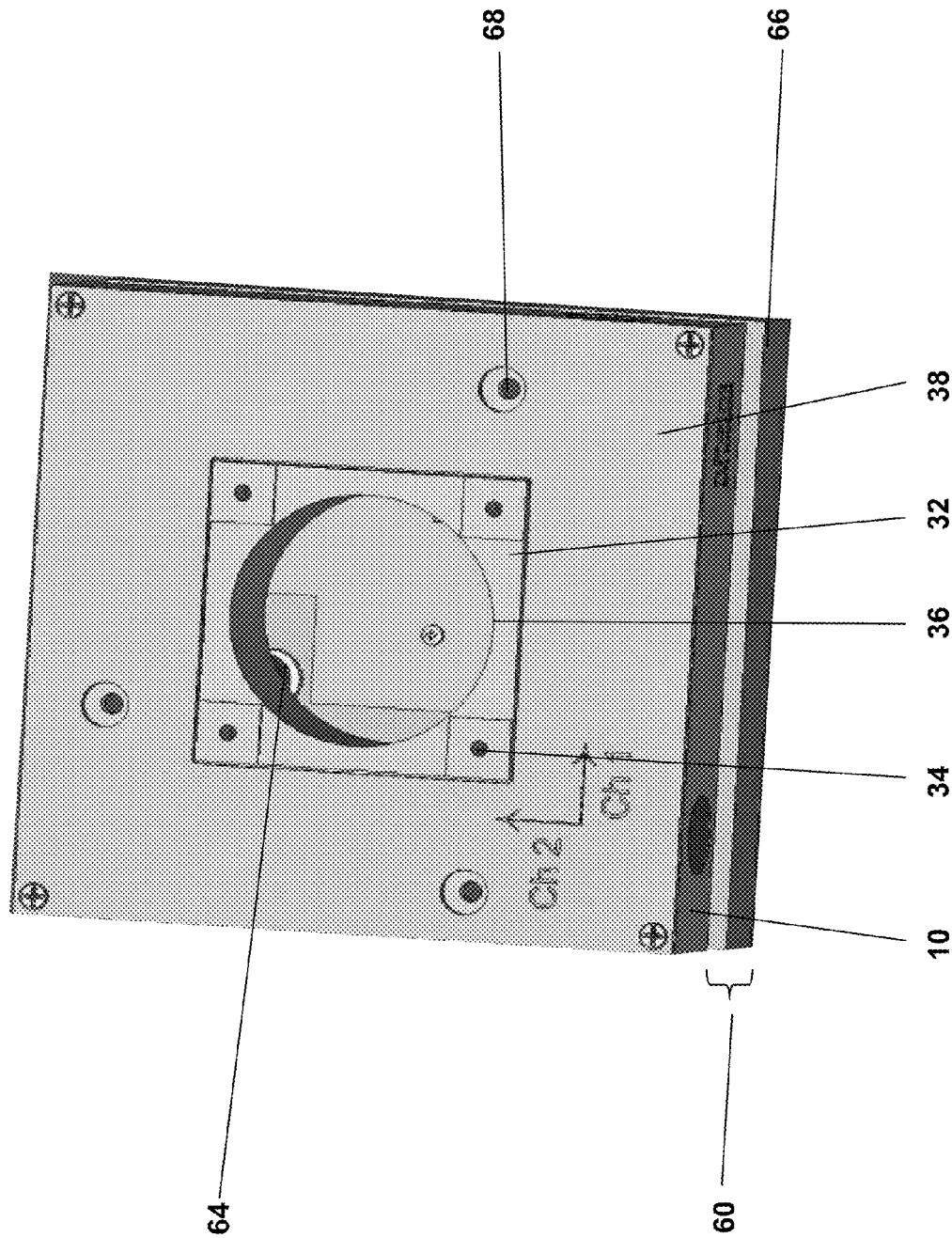
FIG. 6 shows a top perspective view of an XY-scanner and an active scanner bow compensator in accordance with a version of the current invention.

An exemplary version of an active scanner bow compensator 60 is shown in FIGS. 5 and 6. The compensator preferably includes a frame of reference 66, mounting supports 68, actuators 62, sensors 64, and a controller 63 operationally connecting the sensors 64 and the actuators 62.

The frame of reference 66 includes any device or AFM member that is vertically stable (along a Z axis) with respect to the AFM device and the Z scanner probe. The frame of reference 66 may comprise part of the AFM device itself or a separate structure rigidly attached to the AFM device. The frame of reference 66 defines X and Y axes of a plane. The plane defined by the frame of reference 66 serves as a baseline for detecting scanner bow of a scanning platform 32. The plane may be defined by the top surface of the frame of reference 66 or may be theoretically defined based on the known topographical structure of the frame of reference 66 and the positions of the sensors 64 and actuators 62.

The mounting supports 68 include any devices that support a scanner 10 above the frame of reference 66. The mounting supports 68 are structured to connect to both the frame of reference 66 a scanner 10. The mounting supports 68 may fixedly or reversibly attach to these devices. The attachments include but are not limited to screws, bolts, welds, adhesives, etc. Other attachments may be used. The mounting supports 68 are preferably configured to be laterally rigid but expandable and compressible along their vertical (Z) axis in response to an external force. The mounting supports 68 thereby allow vertical motion of the scanner 10 relative to the frame of reference 66 while providing lateral rigidity to the system. A preferred version of the mounting supports 68 includes spring-loaded supports.

The actuators 62 include any devices capable of adjusting the orientation of a frame 38 and/or scanning platform 32 relative to the frame of reference 66. The actuators are preferably positioned between the frame of reference 66 and the frame 38 of a scanner 10 as shown in FIG. 5 and respond to an input signal by expanding or compressing along their vertical (Z) axis. The expansion or compression of the actuators 62 results in movement of the frame of reference 66 relative to the scanner 10 by expanding or compressing, respectively, the mounting supports 68.

The actuators are preferably piezoelectric actuators but can be any type of actuator now known or developed in the future. The piezoelectric actuators may be constructed from any piezoelectric material, including $(Na_{0.5}K_{0.5})_{0.945}Li_{0.055}Nb_{0.96}Sb_{0.04}O_3$ (hereinafter "Sb—NKNLN"), $Sb-(Na_{0.5}K_{0.5})NbO_3-LiTaO_3$ (hereinafter "Sb—NKNLT"), $Sr-(Na_{0.5}K_{0.5})NbO_3-LiTaO_3$ (Sr—NKNLN), $Sr-(Na_{0.5}K_{0.5})NbO_3-LiTaO_3$ (Sr—NKNLT), $SbSr-(Na_{0.5}K_{0.5})NbO_3-LiTaO_3$ (SrSb—NKNLN), $SrSb-(Na_{0.5}K_{0.5})NbO_3-LiTaO_3$ (SbSr—NKNLT), solid solutions with $(Bi_{0.5}K_{0.5})TiO_3$, $(Bi_{0.5}Na_{0.5})TiO_3$, $Ba(Zr_xTi_{1-x})O_3$, $BaTiO_3$ (hereinafter "BT"), $(Bi_{1/2}K_{1/2})TiO_3$ (hereinafter "BKT"), $(Bi_{1/2}Na_{1/2})TiO_3$ (hereinafter "BNT"), $Ba(Zr_xTi_{1-x})O_3$ (hereinafter "BZT"), $Bi(Zn_{1/2}Ti_{1/2})O_3$ (hereinafter "BiZT"), $(Na_xK_{1-x})NbO_3$ (hereinafter "NKN"), $BiScO_3-PbTiO_3BaTiO_3-(Bi_{1/2}K_{1/2})TiO_3$ (hereinafter "BKBT"), $(Bi_{1/2}Na_{1/2})TiO_3-(Bi_{1/2}K_{1/2})TiO_3$ (hereinafter "BNKT"), $(Bi_{1/2}Na_{1/2})TiO_3-BaTiO_3$ (hereinafter "BNBT"), $(Bi_{1/2}Na_{1/2})TiO_3-Ba(Zr_xTi_{1-x})O_3$ (hereinafter "BNBZT"), $(Bi_{1/2}Na_{1/2})TiO_3-BaTiO_3-(Bi_{1/2}K_{1/2})TiO_3$ (hereinafter "BNBK"), and highly piezoelectric lead magnesium niobate-lead titanate solid solutions, e.g., $(Pb(Mg_{1/3}Nb_{2/3})O_3)_{0.65}-(PbTiO_3)_{0.35}(PMN_{0.65}-PT_{0.35})(PMN-PT)$.

The sensors 64 include any devices capable of detecting out-of-plane motion (i.e., "parasitic" or Z-axis motion or displacement) of the scanning platform 32 relative to the frame of reference 66. The sensors 64 preferably span a gap defined by the underside of a scanning platform 32 on a scanner 10 and the frame of reference 66. The sensors are configured so that the movement of the scanning platform 32 along X or Y axes does not affect their capacity to detect the position of the scanning platform 32 along the Z axis.

The sensors 64 are preferably capacitive sensors but can be any type of motion or displacement sensor now known or developed in the future. Other suitable types of sensors include but are not limited to linear variable differential transformer (LVDT) sensors, magnetostricitve sensors, laser-based sensors, Eddy current sensors, and optical triangulation sensors.

The sensors 64 and the actuators 62 are operationally connected. As used herein, "operationally connected" means that positional displacement sensed by the sensors 64 results in a compensatory response by the actuators 62. The sensors 64 and the actuators 62 are preferably operationally connected via a controller 63. The controller 63 receives positional information from the sensors 64 and delivers an input signal to the actuators 62. The input signal from the controller 63 induces the actuators 62 to either expand or compress to correct any vertical displacement of the scanning platform 32 relative to the frame of reference 66. In a preferred version, the controller is a 3-channel controller capable of delivering input signals that induce Z-axis movement in each of the three actuators.

In preferred version, each sensor 64 is "paired" with a single, corresponding actuator 62, wherein the sensor 64 is radially aligned with the corresponding actuator 62 along a line emanating from the center of the frame of reference 66 and/or scanning platform 32. Each sensor 64 is preferably positioned proximal to the corresponding actuator 62. In such a case, the controller 63 may process the positional information from each sensor 64 and individually deliver an input signal to the corresponding actuator 62. Each sensor-actuator pair 64-62 would be coupled on an individual basis. Alternatively, the controller 63 may be configured to link any number of the sensor(s) 64 to any number of the actuator(s) 62. For example, the controller 63 may integrate positional information from all or a subset of the sensors 64 and deliver a distributed input signal to all or a subset of the actuators 62.

There is no requirement that the number of sensors and the number of actuators be equal, that is, the sensor and actuators do not have to appear as mated pairs (as shown in FIG. 5). Any configuration of sensors 64 and actuators 62 is acceptable as long as the sensors 64 are capable of sensing the out-of-plane motion of the scanning platform 32 and the actuators 62 are capable of adjusting the orientation of the frame of reference 66 to compensate for the displacement.

Because a plane is defined by three points, the preferred version of the compensator 60 contains at least three sensors 64 and at least three actuators 62. However, some versions of the invention contain more than three sensors 64 and/or actuators 62, such as four, five, six, or more. Other versions contain fewer than three sensors 64 and/or actuators 62, such as two. Such versions replace a third sensor 64 and/or actuator 62 with vertically stable supports. At a minimum, the device must include at least one sensor 64 and at least one actuator 62.

In use, any vertical displacement of the XY scanning platform 32 that occurs while it moves along the XY plane is detected by the sensors 64. The vertical displacement is corrected by expansion or compression of the actuators 62 against the frame 38 of the scanner 10. In addition to active compensation, the orientation of the sample on the scanning platform can also be adjusted "manually," i.e., independently of actuator 62 activity, to make the sample top surface parallel to the frame of reference 66. This becomes important when a large sample slope is present and non-linearity may be a factor (see Example 4 below).

The compensators 60 described herein are capable of reducing out-of-plane scanner bow to no greater than about 2 nm per 100 μm of scanning range for scanning ranges up to about 100, 250, 500 or 1000 μm.

The compensators 60 described herein are capable of reducing out-of-plane scanner bow at scanning frequencies of at least about 1 Hz.

Any version of any method, element, or device of the invention may be used with any other method, element, or device of the invention.

All combinations of method or process steps as used herein can be performed in any order, unless otherwise specified or clearly implied to the contrary by the context in which the referenced combination is made.

The methods, elements, and devices of the present invention can comprise, consist of, or consist essentially of the essential elements and limitations described herein, as well as any additional or optional steps, components, or limitations described herein or otherwise useful in the art of AFM scanning.

As used in this specification and the appended claims, the singular forms "a," "an," and "the" include plural referents unless the content clearly dictates otherwise. Thus, for example, reference to "a sensor" includes one, two, or more sensors. The term "or" is generally employed in its sense including "and/or" unless the content clearly dictates otherwise.

It is understood that the invention is not confined to the particular construction and arrangement of parts herein illustrated and described, but embraces such modified forms thereof as come within the scope of the claims.

EXAMPLE 1

This Example tested the effect of the exemplary compensator as shown in FIGS. 5 and 6 in reducing scanner bow over a 90-μm scan.

Figure 7A:
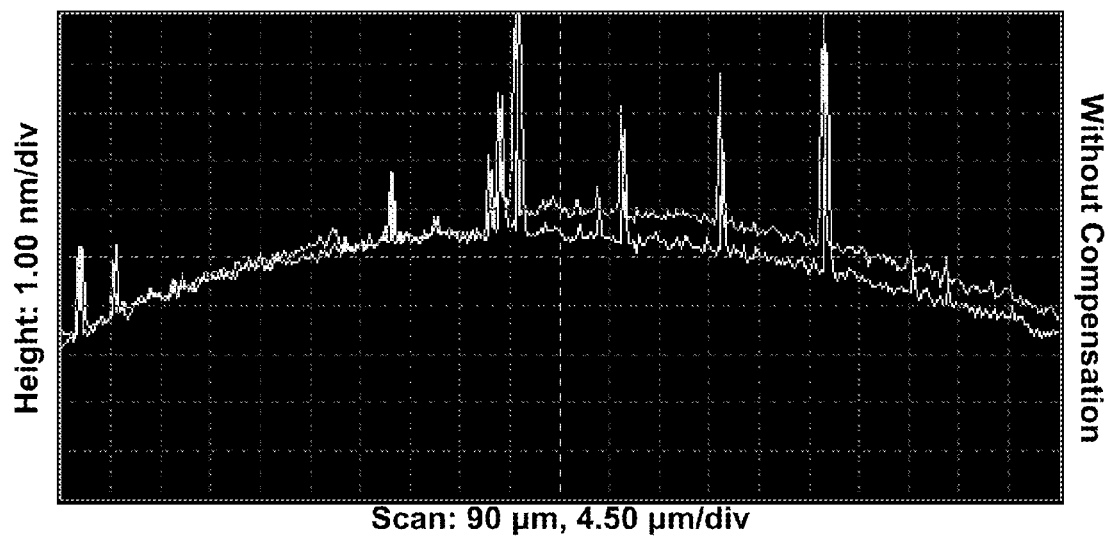
FIG. 7A shows a graph depicting out-of-plane scanner bow in nm on the Y-axis versus scanner travel in µm on the X-axis with a 90-µm scan performed with an AFM with no compensation. The maximum out-of-plane bow is approximately 3 nm.
Figure 7B:
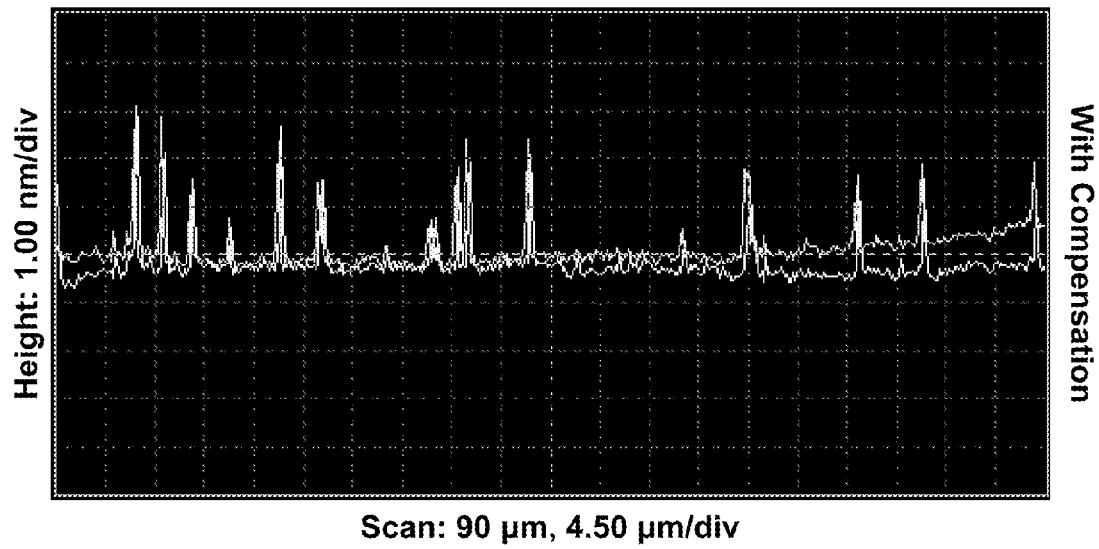
FIG. 7B shows a graph depicting out-of-plane scanner bow in nm on the Y-axis versus scanner travel in µm on the X-axis with a 90-µm scan on the same area of the scanner as performed in FIG. 8A but with active compensation with an active scanner bow compensator in accordance with the current invention. The maximum out-of-plane bow is reduced to less than 1 nm.

A sample was mounted in a fixture and attached near a corner of a scanning platform of an XY scanner as shown in FIGS. 5 and 6 using four mounting holes. To obtain an initial reading of scanner bow in the absence of active compensation, 90 μm of the sample was scanned with a Z scanner probe along a single axis of the XY plane, forming a trace, and re-scanned in the opposite direction, forming a retrace. FIG. 7A shows the scanner bow in the sample in the absence of active compensation. The scanner bow was approximately 3 nm over the 90 μm of travel in the XY plane. The same XY scanning procedure was repeated but with active compensation, as shown in FIG. 7B. The scanner bow was reduced to approximately 1 nm over the 90 μm of travel in the XY plane with active compensation.

This example shows that an active scanner bow compensator can reduce scanner bow to about 1 nm over a 90-μm scan.

EXAMPLE 2

This Example tested the effect of the exemplary compensator as shown in FIGS. 5 and 6 in reducing scanner bow over 180-μm scans at various portions of the scanning platform.

Using a silicon wafer sample, the out-of-plane motion was characterized over a 180-μm scan at the center and at a corner of the scanning platform. The same AFM configuration and methods were used as described in Example 1.

Figure 8A:
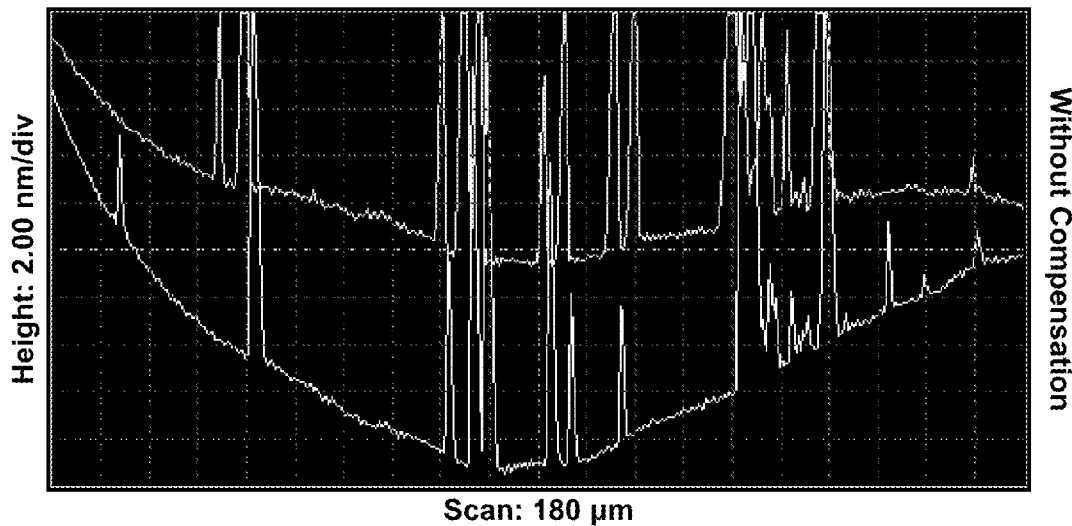
FIG. 8A shows a graph depicting out-of-plane scanner bow in nm on the Y-axis versus scanner travel on the X-axis with a 180-µm scan performed at the center of a scanning platform with no compensation.
Figure 8B:
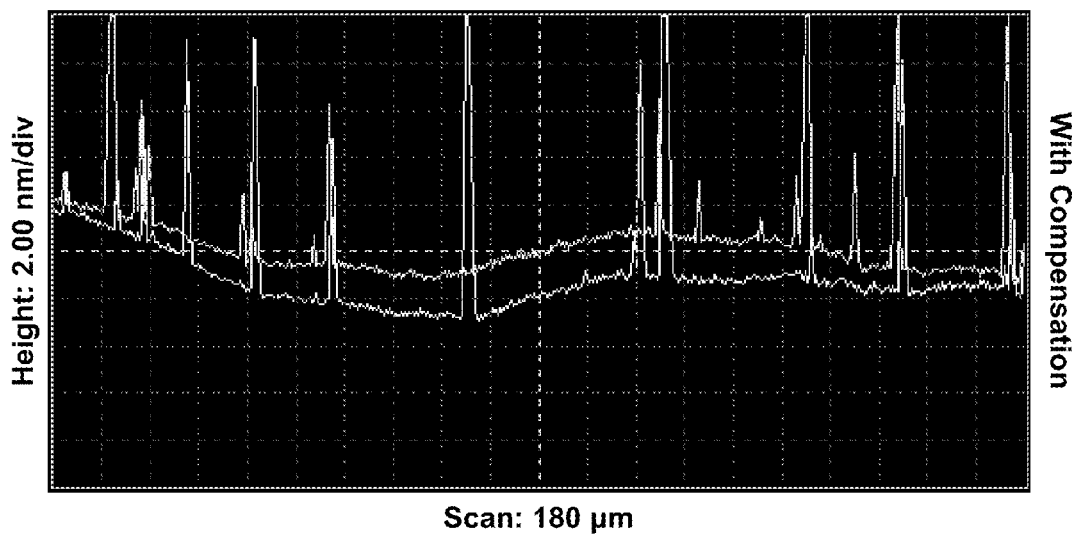
FIG. 8B shows a graph depicting out-of-plane scanner bow in nm on the Y-axis versus scanner travel on the X-axis with a 180-µm scan performed at the center of the same scanning platform as in FIG. 8A but with active compensation.

FIG. 8A shows the out-of-plane motion occurring at the center of the scanning platform in the absence of active compensation. Significant scanner bow was observed with both the scan and re-scan. Additionally, inconsistencies between the scan and re-scan were observed. FIG. 8B shows the out-of-plane motion occurring at the center of the scanning platform with active compensation. Both a reduction in out-of-plan motion and an increase in the consistency between the scan and re-scans were observed with active compensation.

Figure 9A:
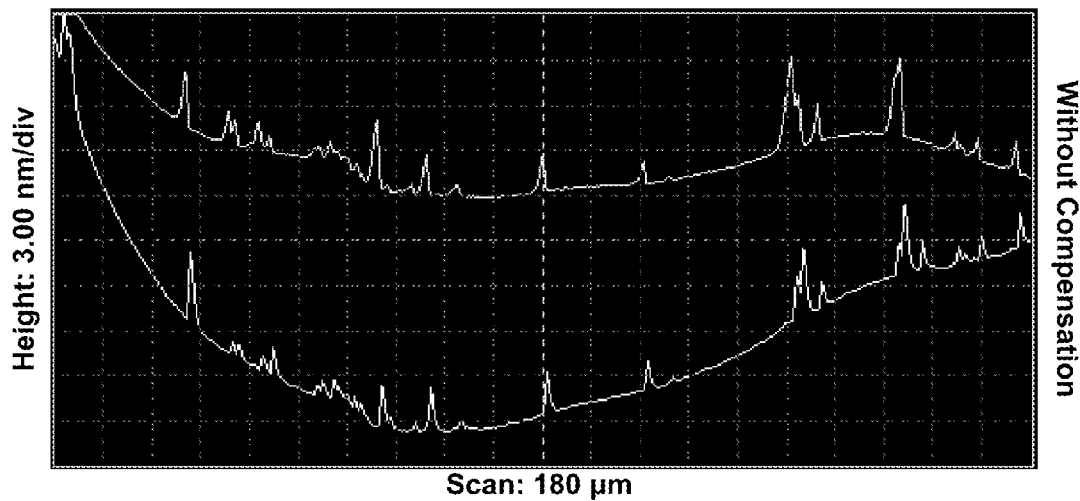
FIG. 9A shows a graph depicting out-of-plane scanner bow in nm on the Y-axis versus scanner travel on the X-axis with a 180-µm scan performed at a corner of a scanning platform with no compensation.
Figure 9B:
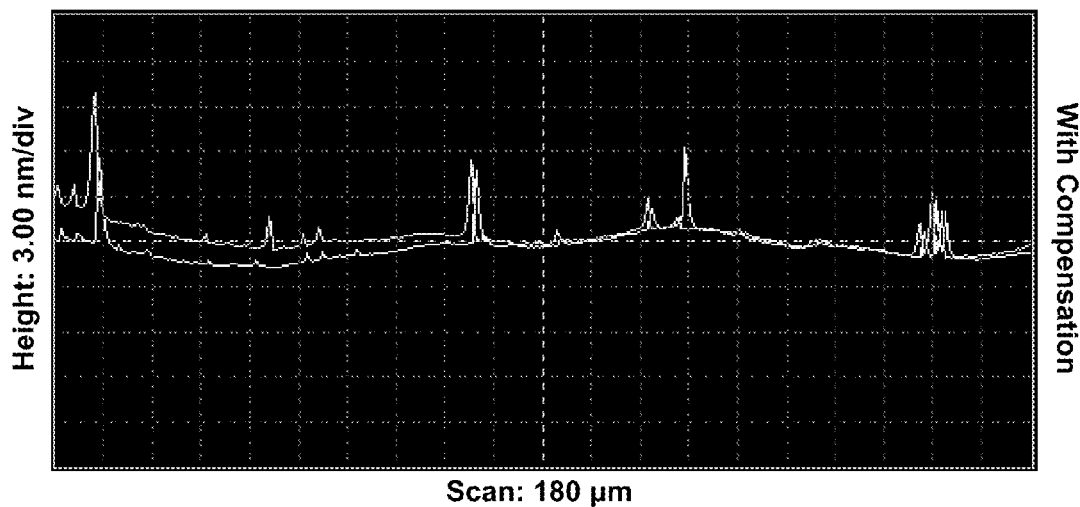
FIG. 9B shows a graph depicting out-of-plane scanner bow in nm on the Y-axis versus scanner travel on the X-axis with a 180-µm scan performed at the same corner of the scanning platform as in FIG. 9A but with active compensation.

FIGS. 9A and 9B show the out-of-plane motion occurring at a corner of the scanning platform without and with compensation, respectively. As at the center of the scanning platform, both a reduction in out-of-plane motion and an increase in the consistency between the scan and re-scans were observed with active compensation (compare FIG. 9A with FIG. 9B).

This Example shows that active compensation increases scanning consistency and reduces out-of-plane motion over different portions of the scanning platform.

EXAMPLE 3

This Example tested whether a vertical load on the scanning platform affects the compensation properties of the compensator.

Figure 10A:
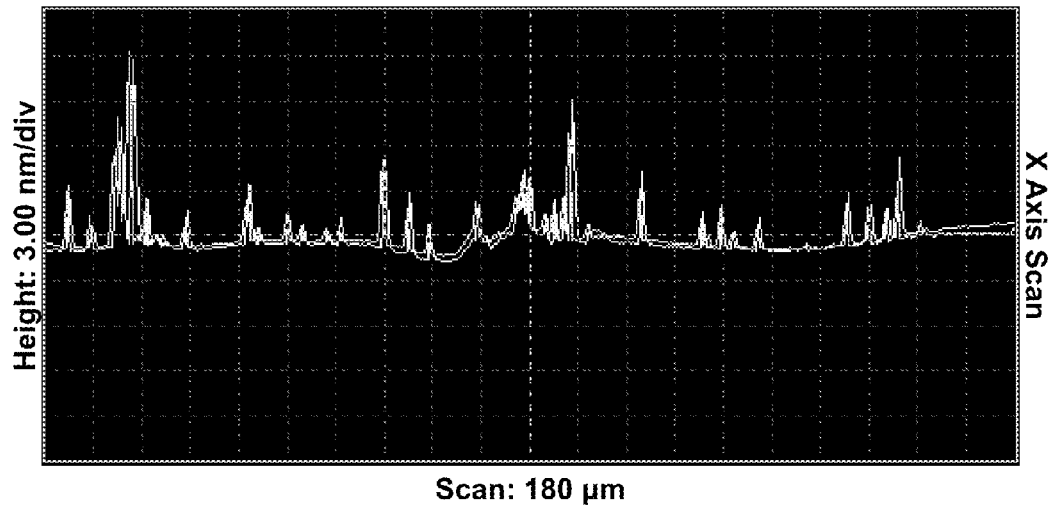
FIG. 10A shows a graph depicting out-of-plane scanner bow in nm on the Y-axis versus scanner travel on the X-axis with a 180-µm, X-axis scan performed at the center of a scanning platform with a 200 g load on the scanning platform. The scan was performed with active compensation.
Figure 10B:
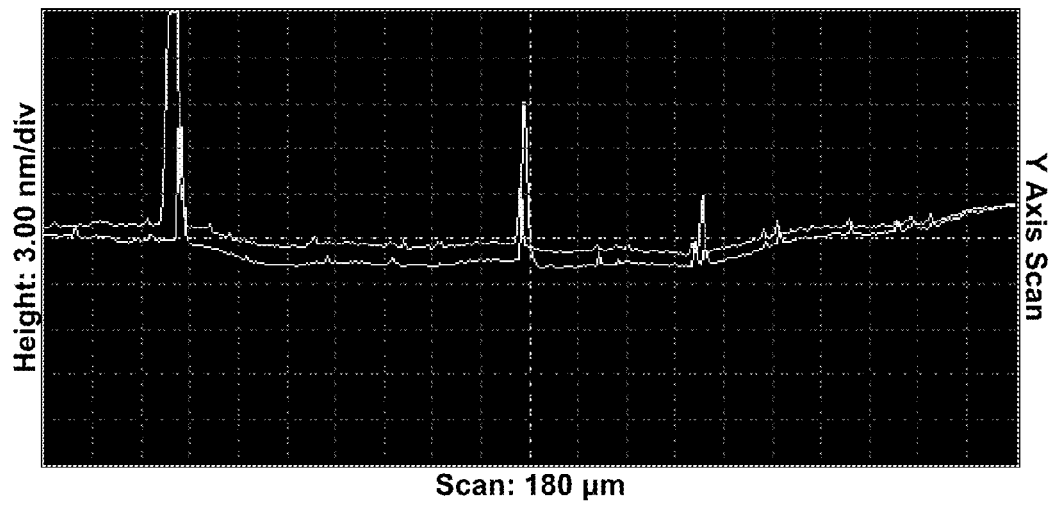
FIG. 10B shows a graph depicting out-of-plane scanner bow in nm on the Y-axis versus scanner travel on the X-axis with a 180-µm, Y-axis scan performed at the center of a scanning platform with a 200 g load on the scanning platform. The scan was performed with active compensation.

Scanning both X and Y axes of the XY plane was performed with a 200 g load on the scanning platform with active compensation. FIG. 10A shows the out-of-plane motion at the center of the scanning platform with a scan taken along the X axis. FIG. 10B shows the out-of-plane motion also at the center of the scanning platform but with a scan taken along the Y axis. FIGS. 10A and 10B show that even with a 200 g load, the scanner was capable of maintaining scanning consistency and minimal scanner bow when using active compensation. Similar results were obtained when the scanning was performed at the corner of the scanning platform (data not shown).

This Example shows that the compensator disclosed herein is capable of operating with vertical loads reaching 200 g.

EXAMPLE 4

This Example tests the capacity of the active compensator to correct for nonlinearity or hysteresis of a Z scanner probe when scanning samples with a large topographical slope.

Problems with AFM measurements may arise when scanning samples with a large topographical slope. As a sample is scanned such that the Z probe is guided against the direction of increasing or decreasing slope, nonlinearity or hysteresis of the Z probe scanner will appear in the final data as variance along the Z axis as the probe is bowed in an arc in the manner of a moving hand of a clock. Because the compensator described herein detects and corrects bowing occurring with the XY scanner, it was hypothesized that the compensator would have no effect in correcting nonlinearity or hysteresis of the Z probe scanner.

To test this hypothesis, two samples, one with a relatively small topographical slope (FIGS. 11A and 11B) and the other with a relatively large topographical slope (FIGS. 12A and 12B), were scanned with active compensation using the AFM configuration and methods described in Examples 1-3. FIGS. 11A and 12A show the scan measurements of the Z probe corrected for the overall sample slope, which are depicted in FIGS. 11B and 12B, respectively. As evidenced by FIGS. 11B and 12B, the sample tested in FIGS. 11A and 11B had a much smaller topographical slope than the sample tested in FIGS. 12A and 12B. The greater topographical slope in the latter sample resulted in aberrant Z-axis readings as evidenced by the curvature in the traces in FIG. 12B compared to those in FIG. 12A.

This example shows, as predicted, that the compensator described herein does not correct for nonlinearity or hysteresis of a Z probe scanner. It is therefore preferred that the compensator described herein be used in AFM devices with sample slope adjustment or linearized Z piezo probes.

What is claimed is:

1. A device for compensating for out-of-plane motion comprising:
   a scanner including:
      a scanning platform; and
      a frame defining X and Y axes of a first plane and supporting the scanning platform, wherein the scanning platform is moveable relative to the frame along the X axis, the Y axis, or the X and Y axes of the first plane; and
   a compensator including:
      a frame of reference defining X and Y axes of a second plane;
      a sensor that detects out-of-first-plane motion of the scanning platform; and
      an actuator operationally connected to the sensor that changes orientation of the first plane relative to the second plane to compensate for the out-of-first-plane motion of the scanning platform detected by the sensor.

2. The device of claim 1 wherein the sensor is disposed between the frame of reference and the scanning platform.

3. The device of claim 1 wherein the frame of reference has a top surface, the scanning platform has a bottom surface that is at least partially exposed while being supported by the frame, and the sensor contacts the top surface of the frame of reference and the bottom surface of the scanning platform.

4. The device of claim 1 wherein the actuator is disposed between the frame of reference and the frame.

5. The device of claim 1 wherein the frame of reference has a top surface, the frame has a bottom surface, and the actuator contacts the top surface of the frame of reference and the bottom surface of the frame.

6. The device of claim 1 wherein the compensator comprises an array of sensors and an array of actuators.

7. The device of claim 6 wherein the array of sensors comprises at least three sensors and the array of actuators comprises at least three actuators.

8. The device of claim 1 wherein the actuator is a piezoelectric actuator.

9. The device of claim 1 wherein the sensor is a capacitive sensor.

10. The device of claim 1 further comprising a controller operationally connecting the sensor and the actuator, wherein the controller receives positional information from the sensor and delivers an input signal to the actuator and wherein the input signal induces the actuator to change the orientation of the first plane relative to the second plane to compensate for the out-of-first-plane motion of the scanning platform.

11. The device of claim 1 further comprising a mounting support connecting the frame of reference to the frame, wherein the mounting support is substantially moveable only in an axis orthogonal to the second plane such that the mounting support inhibits translational motion of the frame relative to the frame of reference along either the first or second planes.

12. The device of claim 1 wherein the scanning platform is moveable in both the X and Y axes of the first plane.

13. A method of compensating for out-of-plane motion with a device as recited in claim 8 comprising:
   supporting the scanner on the compensator;
   detecting out-of-first-plane motion of the scanning platform with the sensor; and
   adjusting orientation of the first plane relative to the second plane with the actuator, wherein the adjusting substantially compensates for the out-of-first-plane motion of the scanning platform detected by the sensor.

14. The method of claim 13 wherein the sensor is disposed between the frame of reference and the scanning platform.

15. The method of claim 13 wherein the sensor contacts a top surface of the frame of reference and a bottom surface of the scanning platform.

16. The method of claim 13 wherein the actuator is disposed between the frame of reference and the frame.

17. The method of claim 13 wherein the actuator contacts a top surface of the frame of reference and a bottom surface of the frame.

18. The method of claim 13 wherein the sensing is performed by an array of sensors and the adjusting is performed by an array of actuators.

19. The method of claim 18 wherein the array of sensors comprises at least three sensors and the array of actuators comprises at least three actuators.

20. The method of claim 13, further comprising operationally connecting the sensor and the actuator with a controller, wherein the controller receives positional information from the sensor and delivers an input signal to the actuators and wherein the input signal induces the actuator to change the orientation of the first plane relative to the second plane to compensate for the out-of-first-plane motion of the scanning platform.

21. The method of claim 13 wherein the supporting includes connecting a mounting support between the frame of reference and the frame, wherein the mounting support is substantially moveable only in an axis orthogonal to the second plane such that the mounting support inhibits translational motion of the frame relative to the frame of reference along either the first or second planes.

22. The method of claim 13 comprising reducing the out-of-first-plane motion of the scanning platform to no greater than 2 nm per 100 μm of scanning range.

* * * * *